Patented Feb. 9, 1932

1,844,393

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF BY-PRODUCT AMMONIA

No Drawing. Application filed March 15, 1929. Serial No. 347,449.

This invention relates to the purification of ammonia produced as a by-product of the manufacture of coke or similar products of the destructive distillation of carbonaceous material. This ammonia is frequently referred to as coal tar ammonia and is almost invariably quite impure, being contaminated with organic compounds such as phenols, heterocyclic bases, such as pyridines, sulfur compounds, both organic and inorganic, such as hydrogen sulfide, and the like. The purification of by-product ammonia has presented great difficulties in the past and has seriously limited its field of utility as its impurities must be removed or transformed into harmless compounds to permit the use of the ammonia for many industrial purposes.

The present invention removes the organic impurities of by-product ammonia by a selective catalytic oxidation in the presence of catalysts which, at the reaction temperature used, favor the oxidation of organic and other impurities but do not effect notable oxidation of the ammonia itself. It has been found that practically all contact masses which have been used in vapor phase organic oxdiations may be utilized in the present invention as at temperatures which are high enough to effect total combustion of the organic impurities, ammonia is relatively stable toward oxidation.

The present invention includes the use of any type of oxidation catalyst, whether stabilized or unstabilized. Among the well known unstabilized contact masses for organic oxidations may be mentioned the oxides of various elements, such as silver, zinc, cadmium, aluminum, thorium, zirconium, titanium, tin, cerium, lead, manganese, and particularly metal elements of the fifth, sixth and eighth groups of the periodic system, such as vanadium, chromium, tantalum, molybdenum, tungsten, uranium, iron, nickel, cobalt, manganese, etc. Other compounds than the oxides have, of course, been used, such as, for example, salts of the metal acids of the fifth and sixth groups, and the like. Platinum and palladium, usually in the form of finely divided elements, have also been used as oxidation catalysts and can be used in the present invention where the ammonia is free from poisons of platinum.

It is found, for example, that stabilized contact masses frequently give advantageous results. These stabilized catalysts have non-catalytic compounds of the alkali forming metals, that is to say alkali metals, alkaline earth metals, and some of the more basic earth metals, associated with them. These compounds may be strongly alkaline as hydroxides, oxides, carbonates, or cyanides of the alkali-forming metals or they may be non-alkaline, neutral salts, or even acid salts. These compounds appear to stabilize the action of the contact mass and for this reason will be referred to throughout the specification as stabilizers. The stabilization of the oxidation catalyst frequently permits the use of higher temperatures without damage to the ammonia and in other cases may result in the oxidation of certain organic compounds to valuable intermediate products. Thus, for example, phenols may be oxidized to maleic acid, and the like. The choice between stabilized and unstabilized catalysts and between different stabilized catalysts, will, of course, depend on whether it is desired to completely burn all organic impurities present or whether it is worth while to transform them into valuable intermediate oxidation products, which can be recovered in many cases. Where complete combustion is desired and considerable amounts of nitrogenous heterocyclic compounds are present, strongly alkaline stabilizers are of advantage as they appear to favor the total combustion of such compounds as pyridine. Where it is desired to oxidize certain of the organic impurities to intermediate products, it is usually preferable to use non-alkaline stabilizers and in some cases it is advantageous to use acid stabilizers, such as, for example, bisulfates of the alkali-forming metals.

In addition to stabilizers it has been found that many contact masses can be improved by the addition of catalytic components which are not specific oxidation catalysts, such as, for example, components which have dehydrogenating, dehydrating, decarboxylating, and similar properties. In the following examples certain specific substances will be described which function in this manner. These non-specific catalytic components appear to enhance the stabilizing effect of the stabilizers and will be referred to throughout the specification as stabilizer promoters, it being clearly understood that the invention is in no sense limited to any theory of action of the stabilizer promoters.

A class of effective contact masses for carrying out the present invention are the so-called uermutogenetic contact masses which includes base exchange bodies, silicous or non-silicious, two-component or multi-component, such as, for example, zeolites and their derivatives, and the products obtained by leaching them with dilute mineral acids. All of these products are highly porous and produce contact masses in which the catalytically active components are most intimately distributed or dispersed and in the case of permutogenetic bodies containing chemically combined components they are molecularly dispersed. The advantageous physical structure of the permutogenetic contact masses, and especially diluted permutogenetic contact masses, render them among the most effective for the purification of ammonia.

The use of stabilized catalysts generally has been described broadly for organic oxidations in my prior Patent No. 1,709,853, dated April 23, 1929, the use of three-component zeolites for organic oxidations has been described in my prior Patent No. 1,722,297 dated July 30, 1929 and, finally, the use of non-silicious base exchange bodies for organic oxidations has been broadly described in my prior Patent No. 1,735,763 dated November 12, 1929. The present invention is in part a continuation of the three above referred to patents. The use of two-component zeolites has been described for organic oxidations in my Patent No. 1,694,122, issued December 4, 1928. It should be understood that any suitable oxidation catalysts described in the foregoing patents may be used for the present invention. As is well known to zeolite chemists, and described in my prior patents above referred to, base exchange bodies consist of an exchangeable base, which can be reversibly exchanged for other bases by treatment with salt solutions and a non-exchangeable nucleus, the components of which can not be so exchanged and are therefore said to be present in non-exchangeable form.

In addition to the permutogenetic contact masses referred to in the above mentioned applications, which are base exchange bodies or their salt-like derivatives, highly effective contact masses may be produced by leaching base exchange bodies or their derivatives with dilute mineral acids, such as, for example, hydrochloric or nitric acid. The leaching first removes exchangeable bases and then gradually removes the more basic portion of the nucleus base exchange body. A series of products are obtained in which part of the exchangeable bases may be retained or in which the leaching may have been carried to the point of complete elimination of the exchangeable bases and part or complete elimination of the more basic portion of the base exchange nucleus. When the leaching is carried to completion leaving only the acid constituents of the nucleus the product is a complex silicic acid, in the case of zeolites and usually is not itself catalytically active but it retains the high porosity characteristic of base exchange body and forms a most effective carrier for the catalytically active elements. I do not claim here broadly the oxidation of organic compounds by means of leached permutogenetic bodies, this forming the subject matter of my co-pending application, Serial No. 294,597, filed July 21, 1928.

It should be understood that in the present invention contact masses are not limited to those which are highly effective for the oxidation of organic compounds to intermediate products and which normally contain as their main catalytically active ingredients one or more of the metal elements of the fifth and sixth groups of the periodic system. On the contrary contact masses which do not contain metal elements of the fifth and sixth groups of the periodic system and which may contain metal elements of the seventh or eighth or other groups of the periodic system are very effective and any contact mass which favors the oxidation of organic compounds and other impurities may be used in the present invention.

In carrying out the process of this invention the impure by-product ammonia is admixed with a suitable oxidizing gas, which may, for example, be air or other gas containing oxygen and is passed over the contact mass to effect suitable combustion of organic or other impurities. It is advantageous in many cases to operate with a considerable excess of oxidizing gas, although the invention is in no sense limited to a process embodying this feature. An almost total combustion of organic impurities takes place and the ammonia obtained can be used, if necessary, after suitable separation from the gas stream, for any of the industrial purposes which normally require highly pure ammonia and which in the past have been largely restricted to synthetic ammonia, which is frequently of considerably higher cost. The present process, therefore, transforms impure by-product ammonia in a simple, cheap and efficient manner into ammonia which can be used in processes requiring a highly purified ammonia.

While it is an advantage of the present invention that by-product ammonia, even when contaminated with large amounts of impurities, can be purified catalytically, it is sometimes desirable to submit the ammonia to partial preliminary purificaton by other well known methods and then to finally purify it by selective oxidation. In other words, the present invention can be applied not only to crude by-product ammonia but also to ammonias which have been partly refined although, of course, unfit for many industrial purposes. The choice of whether the crude by-product ammonia is to be catalytically purified or whether partial purification by other methods is to precede the catalytic purification is primarily an economic question and depends on whether the preliminary purification can be effected more cheaply or can result in the recovery of by-products in a form in which they could not be recovered if the crude ammonia were catalytically purified. In every case, of course, the skilled chemist will apply the present invention to a crude or partly purified ammonia of the grade giving the best results in any particular installation.

The invention will be described in greater detail in connection with a few specific examples which represent a number of modifications of the invention which, however, is in no sense limited to the exact details set forth in the examples, which are intended only as illustrations of typical modifications.

*Example 1*

A contact mass is prepared by impregnating fragments of fire brick with a solution containing equi-molecular mixture of copper and ferric nitrate to which from 2 to 5% of bismuth nitrate has been added. After impregnating the fire brick granules, they are calcined with air at about 650° C. until the nitrates have been transformed into the corresponding oxides. The contact mass is then filled into a converter and a mixture of by-product ammonia and air is passed over at from 300–500° C., preferably at about 400° C. The organic and sulfur containing impurities are burned out or transformed into sulfur trioxide, and the purified ammonia may be removed from the exhaust gases by washing in cold water or by any other suitable means. In this contact mass bismuth oxide, a dihydrogenation catalyst, is a non-specific catalytic component.

It should be noted that the above contact mass, which is a well known ammonia oxidation contact mass, at the lower temperature used no longer favors the oxidation of ammonia but permits purification by combustion of the impurities without substantially attacking the ammonia. Similarly, other known ammonia oxidation contact masses can be used under reaction conditions such as those described above.

*Example 2*

Fragments of ilmenite or an artificial mixture of iron oxide and titanium oxide, a catalyst favoring both dehydration and dehydrogenation containing approximately the same proportions of the oxides are filled into a converter and a mixture of by-product ammonia and air containing a considerable excess of oxygen over that theoretically required to burn out the impurities present, is passed over the contact mass at 300–500° C., preferably at about 400° C. The impurities are burned and the purified ammonia may be recovered in the usual manner.

*Example 3*

An artificial carrier is made by impregnating 80 parts of kieselguhr or silicate rock with a concentrated solution containing 25 parts of potassium cadmiate. Cadmium oxide is a dehydrogenation catalyst and functions as a stabilizer promoter in the contact mass. The mixture is then formed into granules, dried and calcined and then sprayed hot with 16 parts of ammonium vanadate dissolved in water. The contact mass produced is preferably treated at 450–500° C. with burner gases or with oxides of nitrogen. The contact mass after this treatment is suitable for many specific catalytic oxidations. Thus for example, ammonia recovered from coal tar distillation and containing small amounts of organic compounds as impurities, can be purified by passing the vapors of ammonia mixed with air in proportions of 1:10 over the above contact mass at temperatures from 400 to 460° C. Instead of cadmiate solution other metallates may be used.

*Example 4*

A natural or artificial zeolite consisting of a sodium aluminum polysilicate is treated with an aqueous solution of potassium chloride, rubidium chloride, cæsium chloride or magnesium sulfate, or mixtures, in order to remove the sodium by base exchange. The zeolite is then dried and sprayed with solutions or suspensions of the oxy metal acids of the fifth group of the periodic system of their ammonium or metal salts, such as ammonium vanadate, iron vanadate, etc. The product is then calcined and if necessary, treated with mineral acid vapors or dilute mineral acids and constitute good catalysts for the catalytic purification of coal tar ammonia when the latter mixed with air is passed over the catalyst at 370–450° C.

In the above contact mass the alumina in the zeolite is a dehydration catalyst while iron compounds are primarily dehydrogenation catalysts, although they exert a slight dehydrating action. Both substances serve as stabilizer promoters in the reaction.

Example 5

10 parts of molybdenum oxide are dissolved in 8.7 parts of 100% KOH dissolved with 150 parts of water and warmed to about 80° C. 7.5 parts of ferric chloride dissolved in 100 parts of water are then added and the light brown precipitate thus obtained is filtered and thoroughly washed. The wet precipitate obtained is suspended in a solution containing 7 parts of potassium sulfate in 250 parts of water and is used to impregnate 200 volumes of pea-sized pumice fragments which are then calcined.

The contact mass is filled into a converter and vapors of by-product ammonia mixed with air are passed over the contact mass at 300–500° C., the impurities being completely attacked, and purified ammonia recovered in the usual manner.

The contact mass described in this example is one which is suited for the catalytic purification of crude anthracene. It should be noted that in general contact masses which are suitable for the catalytic purification of crude anthracene are also suitable for use in the present invention under the reaction conditions given.

Instead of iron molybdate, molybdenum oxide or other molybdates, such as silver or copper molybdates, or acids or salts of tungsten, chromium or uranium may be used. In place of the stabilizer used potassium bromide, potassium cyanide, potassium chloride, sodium sulfate or other stabilizers may be used.

Example 6

12 parts of vanadic acid are treated with sufficient 2 N. potassium hydroxide solution so that not only is all of the $V_2O_5$ dissolved in the form of potassium vanadate, but an excess of 14 parts of 100% KOH remains. A mixture of 120 parts of comminuted quartz and 20 parts of kieselguhr is impregnated with the above described solution. The second solution is prepared by reducing 10 parts of vanadic acid to vanadyl sulfate in the usual manner and neutralizing the excess sulfuric acid with 2 N. potassium hydroxide solution.

Solution 2 and suspension 1 are then kneaded together thoroughly and dried at temperatures under 100° C. The product is a base exchange body containing $K_2O$, $V_2O_5$, and $V_2O_4$. The large lumps are broken into small fragments whereby a good, efficient catalyst is obtained for the catalytic oxidation of tar ammonia. Tar ammonia mixed with air, a large excess of air in proportion to the organic impurities of the ammonia being preferable, is led over the contact mass at 380–450° C. The organic impurities are entirely burned out or transformed into water soluble compounds and the resulting ammonia is purified by selective oxidation of the organic impurities.

Example 7

The following solutions are prepared:

1. 30 parts of nickel nitrate containing 6 mols of water of crystallization are dissolved in 200 parts of water and sufficient 25% ammonia is added until a clear solution of the nickel ammonium nitrate is obtained. Nickel is a dehydrogenation catalyst.

2. 4 parts of freshly precipitated aluminum hydroxide are stirred into a slurry with 50 parts of water and are then heated with a sufficient 10 N. sodium or potassium hydroxide solution to just form a clear solution of the corresponding aluminate.

3. 10 parts of chromium nitrate with 9 mols of water of crystallization are dissolved in 150 parts of water and then treated with 5–10 N. potassium or sodium hydroxide solution until the corresponding chromite is formed. Chromic oxide is primarily a dehydration catalyst.

4. 8 parts of zinc nitrate containing 6 mols of water of crystallization are dissolved in 50 parts of water and treated with just sufficient 5–10 N. sodium hydroxide solution to form sodium zincate. Zinc is both a dehydrogenation and a decarboxylation catalyst.

5. 40 parts of nickel nitrate with 6 mols of water of crystallization are dissolved in 200 parts of water.

6. 11 parts of zirconium nitrate with 5 mols of water of crystallization are dissolved in 150 parts of water. Zirconium oxide is both a dehydration and dehyrogenation catalyst, having almost equal properties for each.

7. 16 parts of titanium nitrate are dissolved in 160 parts of water.

Solutions 1, 2, 3 and 4 are mixed together and 300 parts of kieselguhr, pumice or quartz are stirred in.

Instead of these diluents pulverized nickel, copper or iron ores may also be used.

To the suspension, a mixture of the solutions of 5, 6, and 7 is added with vigorous agitation. A gelatinous reaction product forms and if it is strongly alkaline to phenolphthalein, the excess of alkali may be neutralized with 5% nitric acid until just neutral or alkaline to phenolphthalein whereby the yield of the base exchange body can be increased.

The product is dried at temperatures below 100° C. and is a base exchange body containing sodium, potassium, ammonium, nickel, aluminum, chromium, zinc, zirconium, and titanium. When broken into fragments and calcined at 400° C. it can be used as contact mass for the purification of by-product ammonia under the reaction conditions described in the foregoing examples.

The contact mass of this example is an excellent contact mass for the catalytic oxidation of crude anthracene and is another example of a contact mass of this type which is suitable for the process of the present invention.

Example 8

18 parts of vanadium pentoxide are suspended in 300 parts of water rendered weakly acid with concentrated sulfuric acid and reduced to the blue vanadyl sulfate by means of sulfur dioxide in the usual manner. The solution is boiled and concentrated to 150 parts of water. One-third of the vanadyl sulfate solution is treated with 10 N. potassium hydroxide solution to transform it into the coffee-brown potassium vanadite, which is then mixed with a solution containing 10 parts of aluminum oxide transformed into potassium aluminate by a 5 N. potassium hydroxide solution. 100 parts of infusorial earth are thoroughly mixed with the vanadite-aluminate solution and the remaining two-thirds of the vanadyl sulfate solution is then introduced with vigorous agitation. The final product should remain strongly alkaline to litmus.

The product is pressed, dried as usual under 100° C., broken into fragments, and then subjected to base exchange by digesting it with a 5% solution of ferric nitrate in order to substitute a maximum of alkali by ferric iron. The product, after base exchange, is filled into a converter and the vapors of by-product ammonia mixed with air are passed over it at 360–450° C., the organic impurities being oxidized to carbon dioxide and water with the production of some elementary nitrogen.

Example 9

Pea sized quartz fragments are treated with 20% solution of hydrofluoric acid in order to etch their surface. On these carrier fragments is formed a base exchange body containing platinum, the amount of coating being about 10% by volume of the carrier fragments.

Instead of forming the base exchange body in situ on fragments the finished base exchange body may be pulverized and afterwards coated on the carrier fragments with the help of adhesive substances such as waterglass $MgSO_4$, $KOH$, $NaOH$, and the like.

The base exchange body is prepared as follows:

5 parts of $Al_2O_3$ are transformed into potassium aluminate using a 5 N. potassium hydroxide solution. After the formation of the potassium aluminate an excess of alkali amounting to 10–15% should be present. 4 parts of $H_2PtCl_6$ in the form of 10% solution are then added to the aluminate solution under vigorous agitation. 22 parts of $Fe_2(SO_4)_3$ 9 aq. are dissolved in 200 parts of water and are then added gradually with strong agitation, care being taken that the resulting reaction product remains slightly alkaline or neutral to phenolphthalein.

The base exchange body obtained containing aluminum, iron and platinum in non-exchangeable form is freed from the mother liquor by pressing and dried.

Instead of an undiluted base exchange body a diluted base exchange body may be used, especially when using powdered quartz or material rich in silica such as colloidal $SiO_2$, kieselguhr and the like, as diluents, and is an effective catalyst for the selective purification of tar ammonia in order to burn out the organic impurities and transform the inorganic impurities such as sulphur to non-volatile compounds whereby ammonia of a high purity is obtained. Tar ammonia is mixed with air in such a ratio that the excess of oxygen based on the amount of impurities is sufficient to be able to burn or transform all the impurities. The best working temperatures are between 320 and 420° C.

Example 10

Three mixtures are prepared as follows:
(1) 210 to 250 parts of potassium or sodium water glass of 33° Bé. are diluted with 15 to 20 volumes of water and mixed with kieselguhr or other material rich in $SiO_2$ such as glaucosil (the acid treated residue of greensant), the diluents being impregnated with 3–5% of iron oxide, nickel oxide, copper oxide, cobalt oxide, aluminum oxide, or a mixture. The amount of diluents added should be such that the suspension is just stirrable.
(2) 18 parts of $V_2O_5$ are dissolved in just sufficient 10–20% caustic potash or caustic soda solution so that potassium or sodium vanadate is obtained.
(3) 18 parts of $V_2O_5$ are reduced with sulfur dioxide in aqueous suspension in the usual way to form the blue vanadyl sulfate, about 200 to 300 parts of water being needed. The excess $SO_2$ is removed by boiling.

Mixtures 1 and 2 are poured together and Solution #3 is permitted to flow in with vigorous agitation, care being taken that the reaction mixture remains at least alkaline to litmus. The alkalinity can be adjusted by slight additions of N. potassium hydroxide solution, if necessary. A dirty gray-blue gel results which is filtered with suction, washed with a little water and then dried and constitutes a three component base exchange body containing tetravalent and pentavalent vanadium in non-exchangeable form and having materials rich in $SiO_2$ finely distributed throughout its framework.

The contact mass is filled into a converter and a mixture of by-product ammonia and air, the amount of air providing a large excess of oxygen over that theoretically required for the total combustion of the organic substances present and for the conversion of sulfur compounds to $SO_3$, is passed over the contact mass at 420–500° C., a very pure ammonia being obtained and recovered in the usual manner.

Example 11

A two-component zeolite of the same empirical chemical composition as that in the foregoing example is prepared by transforming the vanadyl sulfate solution into coffee-brown potassium vanadite by means of 10 N. KOH. After mixing the three mixtures it may be necessary to reduce the alkalinity by means of 2 N. sulfuric acid which should be added cautiously in small quantities until the mixture is neutral or just alkaline to phenolphthalein. The two-component zeolite contact mass is used under the same reaction conditions as in the foregoing example and is an excellent contact mass for the catalytic purification of by-product ammonia.

Example 12

Quartz fragments about the size of a pea are treated with about 20% solution of hydroflouric acid in order to roughen the surface of the quartz fragments. On these carrier fragments a three component base exchange body containing platinum is formed, the amount of coating preferably being about 10% of the volume of the carrier fragments.

Instead of forming the base exchange body in situ on the fragments the finished three component base exchange body may be pulverized and coated afterwards on the carrier fragments with the help of adhesive substances such as watergloss, $MgSO_4$, KOH, NaOH and the like.

The base exchange body is prepared in the following way:

1. 2 parts of $Al_2O_3$ are transformed into potassium aluminate using N. potassium hydroxide solution.
2. 40 parts of sodium waterglass solution of about 36° Bé. are diluted with five volumes of water.
3. 4 parts of $H_2PtCl_6$ are prepared in a 2 to 5% solution.
4. 15 parts of $Fe_2(SO_4)_3$ 9 aq. are dissolved in about 150 parts of water.

The solutions 1 and 2 are poured together and then the mixture of the solutions 3 and 4 is poured in with vigorous agitation, care being taken that the resulting three component base exchange body, containing aluminum $SiO_2$, iron and platinum in non-exchangeable form, remains alkaline to litmus or preferably neutral to phenolphthalein.

The base exchange body obtained is freed from the mother liquor by pressing, and then dried. Before using this material it may advantageously be hydrated by trickling water over it until the water which drains off does not contain appreciable amounts of salts.

Instead of using an undiluted base exchange body a diluted base exchange body may be prepared, particularly one using powdered quartz, silicates or other materials rich in silica, such as colloidal $SiO_2$, kieselguhr, and the like, as diluents. A contact mass prepared with such a multi-component diluted base exchange body is an effective contact mass for the catalytic purification of coal tar ammonia, crude naphthalene and the like, many of the impurities being selectively burned out during the reaction as described in former examples.

Example 13

22 parts of basic copper carbonate are dissolved in the form of a cuprammonium compound. 10.2 parts of freshly precipitated aluminum hydroxide are dissolved in sufficient 2 N. sodium hydroxide solution to form a clear sodium aluminate solution. 24 parts of copper nitrate containing 3 mols of water are dissolved in 100 parts of water. The cuprammonium carbonate and the aluminate solution are then mixed together and the copper nitrate solution poured in with vigorous agitation. A gelatinous product is formed which is neutral or slightly alkaline to phenolphthalein, which constitutes a non-silicious base exchange body containing sodium, copper and aluminum. The gel is pressed and dried at temperatures under 100° C. and then hydrated with water. Thereupon the non-silicious base exchange body is placed on a nutch filter and carefully leached with 2–5% sulfuric acid, 250–500 parts of the diluted acid being gradually trickled over the base exchange body. If desired part of the exchangeable alkali may be replaced by such bases as iron, cobalt, manganese, chromium, titanium, zirconium, copper or thorium by trickling 5–10% solutions of the corresponding salts over the base exchange body. Thereupon the product is leached to remove exchangeable alkali.

Salt-like bodies of the base exchange body may also be formed as has been described above in the foregoing examples and then leached.

The contact masses after leaching are kneaded with 15–20% by weight of potassium sulfate, potassium nitrate, potassium chloride, potassium hydroxide, potassium carbonate, potassium phosphate or other alkali metal compounds in the form of water solutions or waterglass solutions may be used as cementing agents. The kneaded products are formed into suitable pellets and calcined at temperatures above 400° C. These contact masses are filled into a converter and by-product ammonia mixed with air, the latter preferably in large excess over that theoretically required for combustion of organic impurities present, is passed over the contact mass at 380–450° C. The organic impurities are entirely burned out or transformed into water soluble compounds. The ammonia is recovered in the usual manner.

In the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salts. When so used in the claims, the term "permutogenetic" will have no other meaning.

This application is in part a continuation of my prior applications, Serial Nos. 196,393, filed June 3, 1927 now Patent No. 1,709,853; 211,638, filed August 8, 1927 now Patent No. 1,735,763; 215,759, filed August 26, 1927 now Patent No. 1,722,297; and co-pending application 294,597, filed July 21, 1928.

What is claimed as new is:

1. A method of purifying by-product ammonia containing organic impurities which comprises passing the by-product ammonia admixed with an oxygen containing gas over an oxidation contact mass at temperatures at which the organic impurities are oxidized and the ammonia substantially unattacked.

2. A method of purifying by-product ammonia containing organic impurities which comprises passing the ammonia admixed with an oxygen containing gas, the amount of oxygen being in excess of that theoretically required for the complete oxidation of the impurities over an oxidation contact mass at temperatures at which the organic impurities are oxidized and the ammonia is substantially unattacked.

3. A method of purifying by-product ammonia which comprises passing the by-product ammonia admixed with an oxygen containing gas over an oxidation contact mass containing at least one compound of an element contained in the groups which includes alkali metals, alkaline earth metals and earth metals whose oxides are not reducible by hydrogen at temperatures at which the impurities are oxidized and the ammonia is substantially unattacked.

4. A method according to claim 1 in which the contact mass contains at least one permutogenetic body.

5. A method according to claim 1 in which the contact mass contains at least one diluted permutogenetic body.

6. A method according to claim 1 in which the contact mass contains at least one permutogenetic body, at least one of the catalytically effective components of the contact mass being combined in or with the permutogenetic body in non-exchangeable form.

7. A method according to claim 1 in which the contact mass contains at least one zeolite.

8. A method according to claim 1 in which the contact mass contains at least one diluted zeolite.

9. A method according to claim 1 in which the reaction is carried out at temperatures between 300–500° C.

10. A method according to claim 1 in which the contact mass contains at least one non-specific catalyst.

11. A method according to claim 3 in which the contact mass contains at least one non-specific catalyst.

12. A method according to claim 1 in which the contact mass contains at least one oxide of the metal falling within the group copper, iron, bismuth.

13. A method of purifying by-product ammonia which comprises passing it admixed with an oxygen containing gas over an ammonia oxidation contact mass, containing at least one oxide of the metal included in the group copper, iron, the contact mass also containing relatively smaller amount of bismuth oxide, at temperatures at which the impurities are oxidized, but the ammonia remains substantially unattacked.

Signed at Pittsburgh, Pennsylvania this 13th day of March, 1929.

ALPHONS O. JAEGER.